US009265193B2

(12) United States Patent
Snyder et al.

(10) Patent No.: US 9,265,193 B2
(45) Date of Patent: Feb. 23, 2016

(54) SPREADER NOZZLE LIGHT

(71) Applicant: AGCO Corporation, Duluth, GA (US)

(72) Inventors: Todd B. Snyder, Jackson, MN (US);
Troy R. Palmquist, Trimont, MN (US)

(73) Assignee: AGCO Corporation, Duluth, GA (US)

(*) Notice: Subject to any disclaimer, the term of this patent is extended or adjusted under 35 U.S.C. 154(b) by 346 days.

(21) Appl. No.: 13/971,105

(22) Filed: Aug. 20, 2013

(65) Prior Publication Data

US 2014/0048612 A1    Feb. 20, 2014

Related U.S. Application Data

(60) Provisional application No. 61/684,855, filed on Aug. 20, 2012, provisional application No. 61/725,644, filed on Nov. 13, 2012.

(51) Int. Cl.
| | |
|---|---|
| *A01C 3/06* | (2006.01) |
| *A01C 23/00* | (2006.01) |
| *A01C 15/04* | (2006.01) |
| *A01C 21/00* | (2006.01) |

(52) U.S. Cl.
CPC .............. *A01C 23/007* (2013.01); *A01C 15/04* (2013.01); *A01C 21/00* (2013.01)

(58) Field of Classification Search
CPC ....... A01C 21/00; A01C 15/04; A01C 23/007
USPC .......................................... 239/650–689, 159
See application file for complete search history.

(56) References Cited

U.S. PATENT DOCUMENTS

| | | | | |
|---|---|---|---|---|
| 5,024,356 | A * | 6/1991 | Gerling | A01C 15/04 222/312 |
| 5,442,527 | A * | 8/1995 | Wichelt | B60Q 1/14 315/83 |
| 5,992,759 | A * | 11/1999 | Patterson | A01C 23/00 239/159 |
| 2013/0256433 | A1 | 10/2013 | Gunthorpe | |
| 2014/0048611 | A1 | 2/2014 | Palmquist | |

* cited by examiner

*Primary Examiner* — Jason Boeckmann

(57) ABSTRACT

An agricultural spreader has a hopper containing a granular material, a boom arm with a plurality of spreader nozzle assemblies configured to disperse the material and a pneumatic supply to propel the granular material from the hopper, and out the spreader nozzle assemblies. The spreader nozzle assemblies include a conduit defining a pathway through which the material is delivered and a spreader nozzle in fluid communication with the pathway. A piezoelectric material is located within the pathway. A light source is located proximate the spreader nozzle and in electrical communication with the piezoelectric material. The light source arranged to direct emitted light into a spread pattern produced by the spreader nozzle.

18 Claims, 3 Drawing Sheets

SPREADER NOZZLE LIGHT

CROSS REFERENCE TO RELATED APPLICATIONS

This application claims the benefit of U.S. Provisional Application Nos. 61/684,855 entitled SPAY NOZZLE LIGHT, filed Aug. 20, 2012, and 61/725,644 entitled SPREADER NOZZLE LIGHT, filed Nov. 13, 2012, which are hereby incorporated by reference in its entirety.

BACKGROUND OF THE INVENTION

1. Field of Invention

The present invention relates generally to a spreader boom on a crop spreader, and more particularly to a spreader nozzle light on the spreader boom.

2. Description of Related Art

The high crop yields of modern agribusiness require application of fertilizers, pesticides, and herbicides. Dispersing these chemicals onto high acreage fields requires specialized machines mounted on or towed by a vehicle. An example of such a machine is the self-propelled crop spreader.

A common design for a self-propelled crop spreader includes a dedicated chassis with a material hopper, boom arms, and spreader nozzles connected to the boom arms. The hopper contains granular material such as fertilizers, pesticides, and herbicides to be spread on agricultural crops in the field. Boom arms extend outward from the sides of the chassis. Boom plumbing contains supply lines and a plurality of nozzles spaced apart along the length of the boom arms at a standard spacing distance which corresponds to the spread pattern of the nozzles. In operation, as the crop spreader crosses the field, granular material is pneumatically applied from the tank through the supply lines along the boom arms, and out through the nozzles. This allows the crop spreader to distribute the granular material along a relatively wide path. The length of conventional boom arms may vary from, for example, 6 meters (18 feet) up to 46 meters (150 feet), but smaller or longer booms are possible. The boom arms typically swing in for transport and out for operation.

In some situations it would be desirable to illuminate a spread pattern of the granular material. For example, a farmer may apply a granular fertilizer at night and may desire to illuminate the applied fertilizer's spread pattern to allow the farmer to view where the fertilizer is being deposited. In addition, illuminating the spread pattern may allow the farmer to notice if a spreader nozzle is blocked or otherwise not spreading the granular material. It would therefore be advantageous to have spreader nozzles lights on the boom arms of the crop spreader.

OVERVIEW OF THE INVENTION

In one embodiment, an agricultural spreader has a hopper containing a granular material, a boom arm with a plurality of spreader nozzle assemblies configured to disperse the material and a pneumatic supply to propel the granular material from the hopper, and out the spreader nozzle assemblies. The spreader nozzle assemblies include a conduit defining a pathway through which the material is delivered and a spreader nozzle in fluid communication with the pathway. A piezoelectric material is located within the pathway. A light source is located proximate the spreader nozzle and in electrical communication with the piezoelectric material. The light source arranged to direct emitted light into a spread pattern produced by the spreader nozzle.

These and other features and advantages of this invention are described in, or are apparent from, the following detailed description of various example embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein:

FIG. 1 perspective view of a boom arm of a crop spreader;

FIG. 2 is a schematic drawing showing a spreader nozzle light on a boom arm of the crop spreader of FIG. 1; and FIG. 3 shows a flow chart for a method of illuminating a spread pattern using the spreader nozzle light of FIG. 2.

The drawing figures do not limit the present invention to the specific embodiments disclosed and described herein. The drawings are not necessarily to scale, emphasis instead being placed upon clearly illustrating the principles of the preferred embodiment. Corresponding reference characters indicate corresponding parts throughout the views of the drawings.

DETAILED DESCRIPTION OF THE PREFERRED EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

FIG. 1 shows a crop spreader 100. Crop spreader 100 includes a frame 102. Frame 102 may be of unitary construction or may include one or more pieces secured together. Frame 102 may comprise a support frame that may span the length of the crop spreader 100 and may provide a structure for mounting other components on crop spreader 100. Crop spreader 100 may also include a cab (not shown) mounted on frame 102. The cab may house an operator and a number of controls for crop spreader 100. Frame 102 may be supported by a plurality of wheels 104. An engine (not shown) may be used to provide energy to propel crop spreader 100 and may provide energy used to spread granular material from the crop spreader 100. Propulsion and direction of the crop spreader 100 may be controlled by one or more operator controls that include, but are not limited to, an accelerator (not shown), a brake (not shown), and a steering wheel (not shown). While a self-propelled crop spreader 100 is shown while describing embodiments of the invention, one skilled in the art will understand that the invention may also be used is a towed crop spreader without departing from the scope of the invention.

Crop spreader 100 may further include a hopper 106 that may be used to store a granular material to be spread on a field. The granular material may comprise chemicals, such as but not limited to, water, herbicides, pesticides, or fertilizers. Hopper 106 may be mounted on frame 102. Crop spreader 100 may include more than one hopper to store different materials to be applied on the field.

Crop spreader 100 may further include a boom arm 108 that may be operable to distribute the granular material over a wide swath in the field. As will be described in greater detail below, a plurality of spreader nozzle assemblies 110 may be spaced along boom arm 108 through which the granular material may be spread as crop spreader 100 is driven forward in the field to distribute the chemicals onto crops in the field. The operator of the crop spreader 100 may use a control handle located within the cab to control boom arm and the granular material dispersion through spreader nozzle assemblies 110. The operator may use the control handle to turn on the granular material flow to the plurality of spreader nozzle assemblies 110 and to shut off the granular material flow to the plurality of spreader nozzle assemblies 110.

Figure 1:
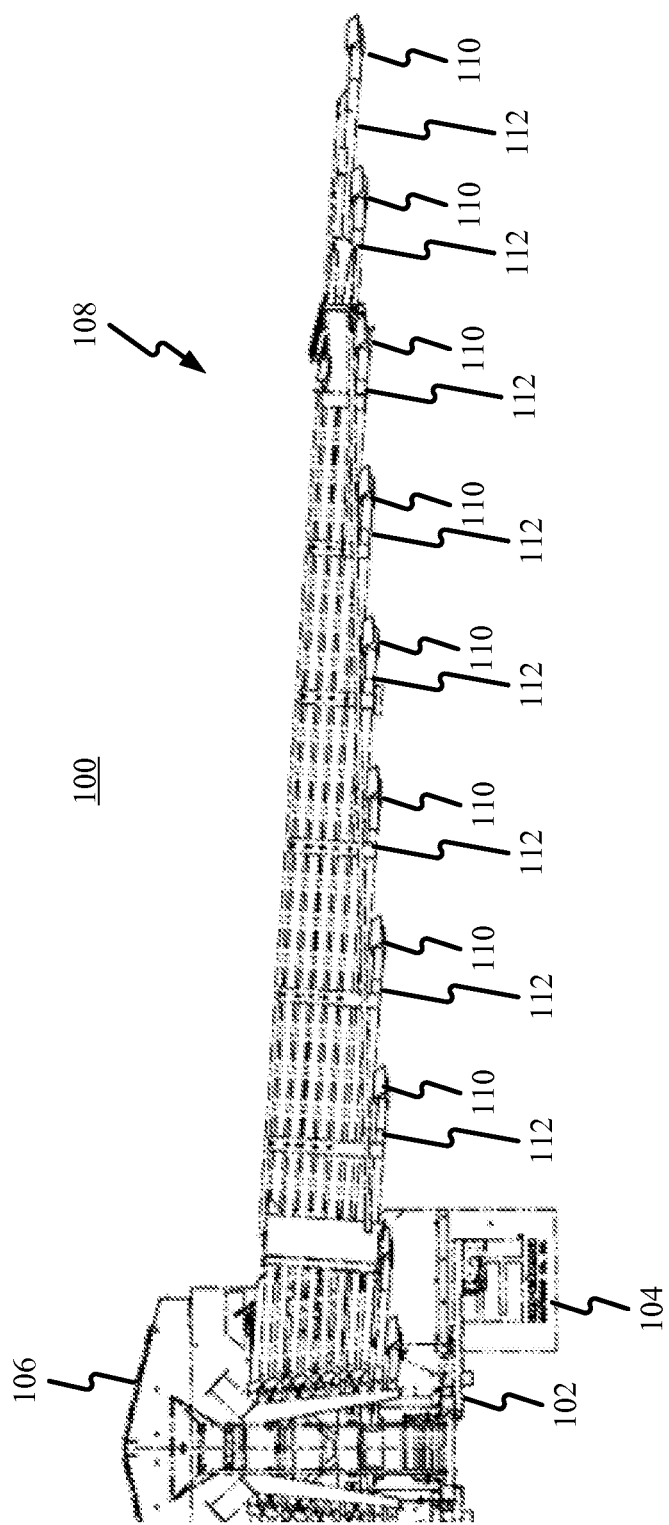

Boom arm 108 may comprise a plurality of conduits 112. The conduits 112 are fluidly connected to the hopper 106 to allow the granular material to flow from the hopper 106 to a plurality of spreader nozzle assemblies 110. As is known in the art, a pneumatic supply propels the granular material through the conduits 112 and out the spreader nozzle assemblies 110. While FIG. 1 shows each spreader nozzle assembly 110 connected to a single conduit 112, embodiments may comprise two or more spreader nozzle assemblies 110 connected a single conduit 112. Conduit 112 may be an integral part of crop spreader 100 or may be detachable from crop spreader 100. For example, conduit 112 may be permanently attached to or located within boom arm 108. Conduit 112 may also be separable from boom arm 108.

Figure 2:
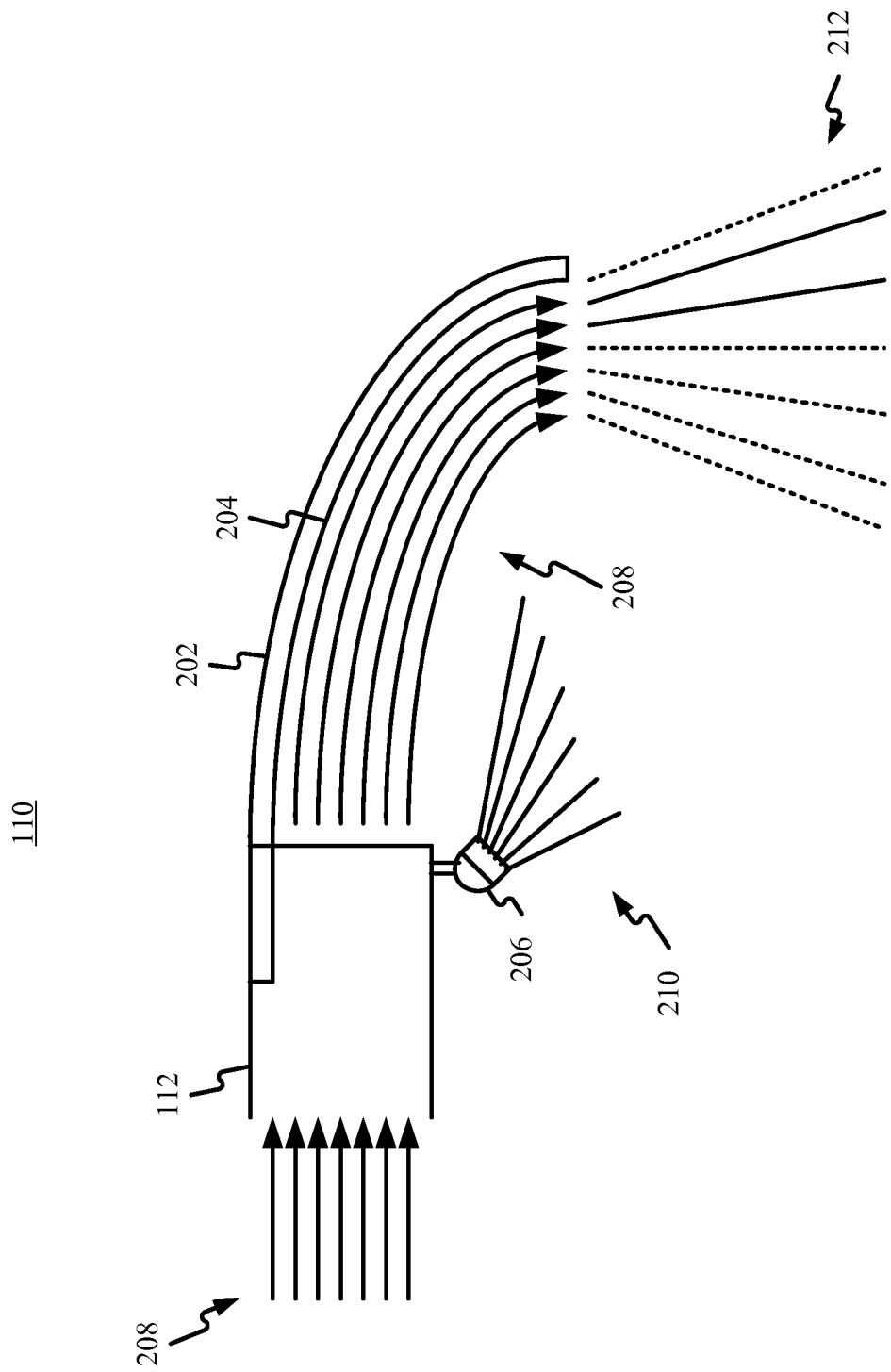

FIG. 2 shows spreader nozzle assembly 110. As shown in FIG. 2, spreader nozzle assembly 110 connects to conduit 112 and includes a spreader nozzle 202, a piezoelectric material 204, and a light source 206. A granular material 208 flows through conduit 112 with the conduit 112 defining a pathway for granular material 208 to reach the spreader nozzle 202. Spreader nozzle 202 may be in fluid communication with conduit 112. The piezoelectric material 204 is operatively located in contact with the conduit 112 and/or spreader nozzle 202. For example, the piezoelectric material 204 may be located on an interior or exterior surface of conduit 112. In addition, piezoelectric material 204 may be attached any surface of spreader nozzle 202. The light source 206 is located proximate the spreader nozzle 202 and in electrical communication with the piezoelectric material 204. Light source 206 may be arranged to direct an emitted light 210 into a spread pattern 212 that may be produced by spreader nozzle 202.

During operation, an operator causes granular material 208 to flow through conduit 112 through operation of valves through any known means as would be understood in the art. As granular material 208 flows through conduit 112, granular material 208 strikes the piezoelectric material 204 and causes a stress and strain within the piezoelectric material 204, thereby causing the piezoelectric material 204 to generate electricity. Piezoelectric material 204 may be any known piezoelectric material, the understanding of which is well known and need not be further described herein. As a result, piezoelectric material 204 generates electricity to power the light source 206. Circuitry may be used to regulate the electrical current produced by piezoelectric material 204 and may convert the current from alternating current (AC) to direct current (DC) as is well known in the art and need not be discussed herein.

The light source 206 may comprise any element that emits light. Examples include an LED light, an incandescent light, a florescent light, an optical fiber or fibers, and a neon light. When light source 206 comprises an optical fiber, the optical fiber may be placed in conduit 112, spreader nozzle 202, or spread pattern 212. Light source 206 may include a single light or multiple lights. In one example embodiment, the boom arm 108 comprises light sources 206 that emit different color lights. For example, spreader nozzle assemblies 110 located at different points along the boom arm 108 may be different colors to indicate a particular position on boom arm 108. For instance, spreader nozzle assemblies 110 located toward the end of boom arm 108 may contain white lights and spreader nozzle assemblies 110 located close to frame 102 may contain red lights. Furthermore, spreader nozzle assemblies 110 may contain multiple lights of differing colors and the operator may be able to select the light color each spreader nozzle assembly 110 or group of spreader nozzle assemblies 110 emit. Moreover, different color lights may correspond to different chemicals exiting spreader nozzle 202. For example, a green light may be utilized for a spreader nozzle assembly plumbed to spread fertilizer, a red light for pesticides, a blue light for herbicides, and a white light for seed. Of course, the colors described herein are for example purposes only and other colors may be used.

Light source 206 may be configured to emit light only when granular material 208 is flowing through the pathway. In other words, light source 206 may not be connected to the electrical system of crop spreader 100 and power may only be supplied to light source 206 when granular material 208 is flowing through spreader nozzle 202. Having light source 206 only receive power from piezoelectric material 204 provides an indication of a blockage in conduit 112. For example, when conduit 112 contains a blockage and granular material 208 is not able to flow or flows at a reduced flow rate, light source 206 may not emit light. The failure of light source 206 to emit light may indicate to the operator that granular material 208 is not flowing through conduit 112 or is flowing at a reduced rate.

Figure 3:
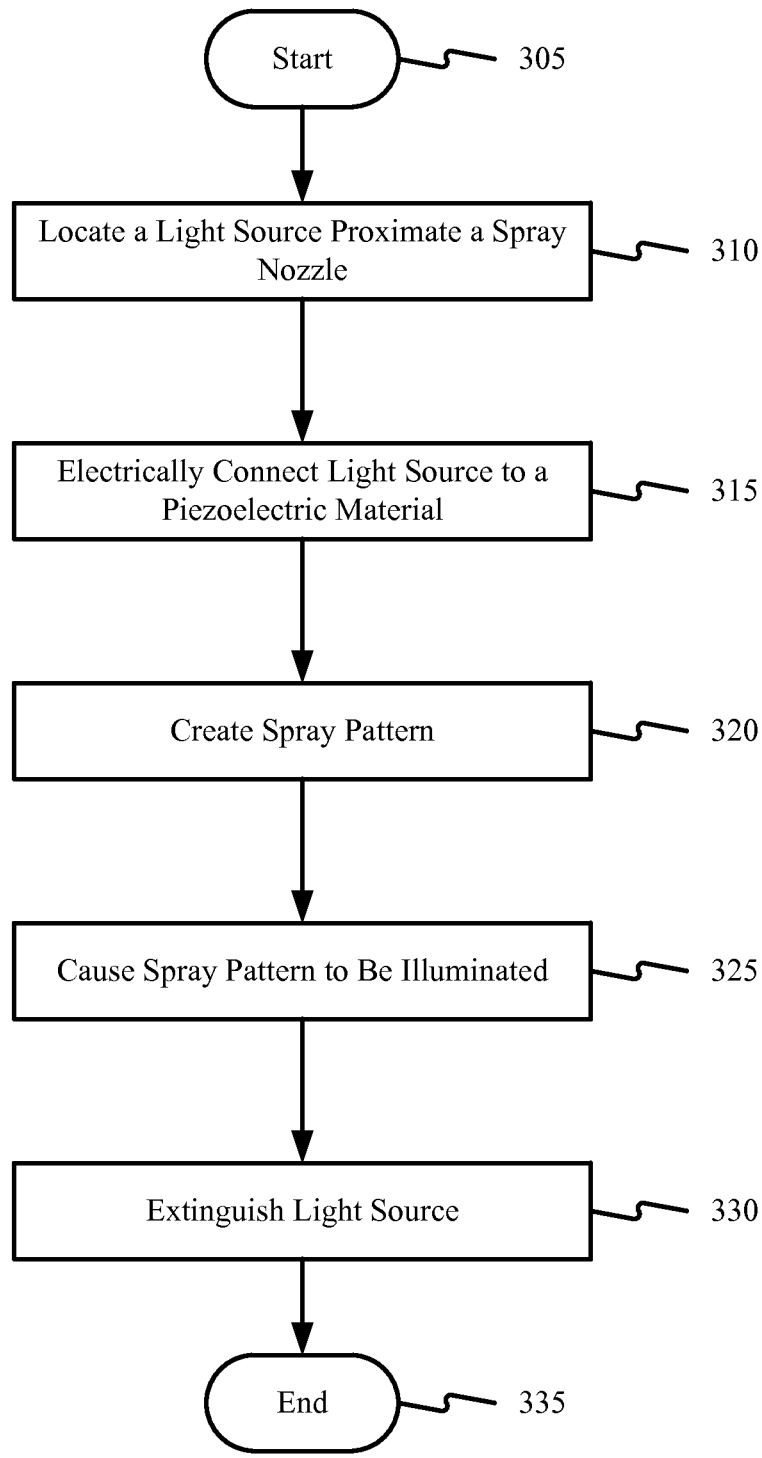

FIG. 3 is a flow chart setting forth the general stages involved in a method 300 for illuminating spread pattern 212. Ways to implement the stages of method 300 will be described in greater detail below. Method 300 begins at starting block 305 and proceeds to stage 310 where a light source 206 is located proximate the spreader nozzle 202. The light source 206 may be located within conduit 112. From stage 310 where light source 206 is located proximate spreader nozzle, method 300 proceeds to stage 315 where light source 206 is electrically connected to piezoelectric material 204.

At stage 320, the spread pattern 212 is created by passing granular material 208 through conduit 112 and out spreader nozzle 202. From stage 320 where spread pattern 212 is created, method 300 proceeds to stage 325 where light source 206 causes the spread pattern 212 to become illuminated. Light source 206 may cause spread pattern 212 to become illuminated by receiving electricity from piezoelectric material 204 and directing emitted light 210 into spread pattern 212. Emitted light 210 may reflect and refract within spread pattern 212.

From stage 325 where light source 206 causes spread pattern 212 to become illuminated, method 300 may proceed to stage 330 where light source 206 may be extinguished. Light source 206 may be extinguished when granular material 208 fails to flow through conduit 112. The failure of granular material 208 to flow through conduit 112 may be caused by a blockage or an operator shutting down crop spreader 100. From stage 330 where light source 206 may be extinguished, method 300 may terminate at termination block 335.

Consistent with embodiments of the invention, a spreader nozzle light may be provided. With embodiments of the invention, it may be possible to illuminate a spread pattern in each of a plurality of spreader nozzles on a crop spreader. In order to provide this, a piezoelectric material may be located proximate each spreader nozzle within a conduit transporting the granular material. Each piezoelectric material may generate electrical energy to power a connected light source.

Locating the piezoelectric material in contact with the conduit transporting the granular material may allow the light source to be powered independent of the crop spreader's electrical system. The light source may direct emit light into the spread pattern.

While this invention has been described in conjunction with the specific embodiments described above, it is evident that many alternatives, combinations, modifications and variations are apparent to those skilled in the art. Accordingly, the preferred embodiments of this invention, as set forth above are intended to be illustrative only, and not in a limiting sense. Various changes can be made without departing from the spirit and scope of this invention.

What is claimed is:

1. An agricultural spreader having a hopper containing a granular material and a boom arm with a plurality of spreader nozzle assemblies configured to disperse the material and a pneumatic supply to propel the granular material from the hopper and out the spreader nozzle assemblies, wherein the spreader nozzle assemblies comprise:

a conduit defining a pathway through which the material is delivered;

a spreader nozzle in fluid communication with the pathway;

a piezoelectric material located within the pathway; and a light source located proximate the spreader nozzle and in electrical communication with the piezoelectric material, the light source arranged to direct emitted light into a spread pattern produced by the spreader nozzle, wherein the light source is power solely by the piezoelectric material.

2. The agricultural spreader of claim 1, wherein the light source is configured to emit light only when a granular material is flowing through the pathway.

3. The agricultural spreader of claim 1, wherein the light source comprises at least one LED.

4. The agricultural spreader of claim 1, wherein the light source comprises a plurality of different color lights.

5. The agricultural spreader of claim 4, wherein each different color light corresponding to a different position on the boom arm.

6. The agricultural spreader of claim 1, wherein the wherein the light source is configured to indicate a blockage in the pathway.

7. An agricultural spreader comprising:

a boom arm;

a conduit defining a pathway;

a plurality of spreader nozzles in fluid communication with the pathway and located at various positions along the boom arm;

a plurality of piezoelectric materials, each of the plurality of piezoelectric materials operatively located within the pathway and respectively located proximate the plurality of spreader nozzles;

a plurality of light sources, each of the plurality of light sources respectively located proximate the plurality of spreader nozzles and respectively in electrical communication with the plurality of piezoelectric materials, each of the plurality of light sources arranged to direct emitted light into spread patterns produced by respective ones of the plurality of spreader nozzles, wherein the plurality of light sources are respectively powered solely by the plurality of piezoelectric materials.

8. The agricultural spreader of claim 7, wherein the plurality of light sources are configured to emit light only when a granular material is flowing through the pathway.

9. The agricultural spreader of claim 7, wherein the plurality of light sources comprise LEDs.

10. The agricultural spreader of claim 7, wherein the plurality of light sources comprises a plurality of different color lights per light source.

11. The agricultural spreader of claim 10, wherein each of the plurality of different color lights corresponds to a different chemical exiting the spreader nozzle.

12. The agricultural spreader of claim 7, wherein the plurality of light sources comprise a plurality of different color lights, each different color light corresponding to a different position on the boom.

13. The agricultural spreader of claim 7, wherein the plurality of light sources are configured to indicate a blockage in the pathway.

14. A method of dispensing granular material from a hopper on an agricultural spreader, the method comprising:

locating a light source proximate a spreader nozzle, the spreader nozzle being connected to a conduit;

electrically connecting the light source to a piezoelectric material located within the conduit;

creating a spread pattern by passing a granular material though the conduit and out the spreader nozzle; and causing the light source to illuminate the spread pattern by receiving electricity from the piezoelectric material at the light source when the granular material is flowing through the conduit, wherein the light source is powered solely by the piezoelectric material.

15. The method of claim 14, further comprising extinguishing the light source when the granular material ceases flowing through the conduit.

16. The method of claim 15, wherein extinguishing the light source is in response to a blockage of the spreader nozzle.

17. The method of claim 14, wherein the light source comprises a plurality of light sources, each light source being a different color.

18. The method of claim 14, wherein the granular material comprises a fertilizer.

* * * * *